(12) United States Patent
Kneer et al.

(10) Patent No.: US 12,515,033 B2
(45) Date of Patent: Jan. 6, 2026

(54) IMPLANT SYRINGE

(71) Applicant: Gaplast GmbH, Altenau (DE)

(72) Inventors: Roland Kneer, Farchant (DE); Stephan Kneer, Farchant (DE); Walter Koller, Unterammergau (DE)

(73) Assignee: Gaplast GmbH, Altenau (DE)

( * ) Notice: Subject to any disclaimer, the term of this patent is extended or adjusted under 35 U.S.C. 154(b) by 694 days.

(21) Appl. No.: 17/411,302

(22) Filed: Aug. 25, 2021

(65) Prior Publication Data
US 2022/0062608 A1 Mar. 3, 2022

(30) Foreign Application Priority Data

Aug. 31, 2020 (DE) .................... 10 2020 122 654.3

(51) Int. Cl.
*A61M 37/00* (2006.01)
(52) U.S. Cl.
CPC ..... *A61M 37/0069* (2013.01); *A61M 2205/02* (2013.01)
(58) Field of Classification Search
CPC ............ A61M 37/0069; A61M 31/007; A61M 5/3243; A61M 5/3202; A61M 5/349; A61M 2005/2411; A61M 2005/2414; A61M 5/343; A61M 5/348; A61B 17/3468; A61B 17/3417; A61F 9/0008; A61F 9/0017;
(Continued)

(56) References Cited

U.S. PATENT DOCUMENTS

| 2003/0073959 A1* | 4/2003 | Koska .................. A61M 5/348 604/240 |
| 2009/0182267 A1* | 7/2009 | Painchaud ........ A61M 37/0069 604/60 |

(Continued)

FOREIGN PATENT DOCUMENTS

| DE | 19532410 A1 | 3/1997 |
| DE | 102016121414 A1 * | 5/2018 ......... B23K 26/0624 |

(Continued)

OTHER PUBLICATIONS

Translation of specification of DE 102016121414 from espacenet.com (Year: 2016).*

(Continued)

*Primary Examiner* — Emily L Schmidt
*Assistant Examiner* — Samuel J Marrison
(74) *Attorney, Agent, or Firm* — Greer, Burns & Crain, Ltd

(57) ABSTRACT

An implant syringe includes a cannula, a storage element for receiving a solid material implant, and an outer sleeve with a radially projecting front gripping section which are axially movable together. An inner sleeve affords axial slits through which radial webs on the outer sleeve engage, and also includes a rod-shaped piston. The rod-shaped piston may be advanced through the storage element into the cannula such that a gap remains between the tip of the cannula and the head end of the piston. The cannula is rigidly connected to the storage element to form a cannula unit, that the webs on the outer sleeve are attached to an annular receiving member within the inner sleeve and that the cannula unit is insertable into the receiving member and is lockable therein, where a solid material implant can be inserted into the storage element.

7 Claims, 5 Drawing Sheets

(58) Field of Classification Search
CPC .... A61K 9/0087; A61K 9/009; A61K 9/0092; A61K 9/02
See application file for complete search history.

(56) References Cited

U.S. PATENT DOCUMENTS

| | | | | |
|---|---|---|---|---|
| 2011/0098675 | A1* | 4/2011 | Schmalz | A61M 37/0069 |
| | | | | 604/60 |
| 2013/0310746 | A1* | 11/2013 | Wozencroft | A61M 5/20 |
| | | | | 29/700 |
| 2014/0378911 | A1* | 12/2014 | Dolk | A61M 5/20 |
| | | | | 604/227 |
| 2015/0374927 | A1* | 12/2015 | Dasbach | A61M 5/3202 |
| | | | | 604/192 |
| 2016/0354556 | A1* | 12/2016 | Zucker | A61M 5/326 |
| 2018/0169349 | A1* | 6/2018 | Mosebach | A61M 5/2033 |
| 2019/0054253 | A1 | 2/2019 | Kneer et al. | |

FOREIGN PATENT DOCUMENTS

| | | |
|---|---|---|
| DE | 102017007893 A1 | 2/2019 |
| EP | 3456374 A1 | 3/2019 |
| WO | WO2012063065 A1 | 5/2012 |

OTHER PUBLICATIONS

EP Search Report dated Aug. 9, 2021 for European Patent Application No. EP20209756.

* cited by examiner

IMPLANT SYRINGE

PRIORITY CLAIM The subject application claims convention priority to German patent application No. 10 2020 122 654.3 filed Aug. 31, 2020.

FIELD OF THE INVENTION

The invention relates to an implant syringe which is used to dispense a strand-like solid material implant with a long-term active substance into the body of a patient. The long-term preparation is generally positioned in the abdominal wall of a patient, into which a receiving passage for the solid material implant was previously pierced by means of a cannula.

BACKGROUND

A prior art implant syringe is disclosed in EP 18 000 649 A1. In this implant syringe, the outer sleeve is integrally connected by radial webs to a needle holder, in whose rear side the storage element, which receives the solid material implant, is secured by adhesive. After the assembly of the inner sleeve and outer sleeve (hereinafter referred to as the applicator) the cannula is secured by adhesive in a front opening in the needle holder. The solid material implant is inserted into the storage element through the open rear side of the inner sleeve and advanced by the rod-shaped piston in the storage element into the lightly clamped starting position. When using the implant syringe to dispense the solid material implant into a patient, the rear gripping section is then advanced with the piston until the solid material implant is advanced to the tip of the cannula, whereafter the outer sleeve, which is exposed in this position, is retracted with the cannula and the storage element whilst leaving the solid material implant in the body of the patient.

In the known implant syringe, the cannula is secured with adhesive, with the applicator fully assembled, in the needle holder, which is located in the interior of the inner sleeve. This process is complicated and when it is done incorrectly the entire applicator must be discarded. Furthermore, the insertion of the solid material implant into the rear side of the storage element held within the inner sleeve by the needle holder is a complicated process.

It is the object of the present invention to provide an implant syringe, in which the assembly and filling of the implant syringe are simplified.

SUMMARY OF THE INVENTION

The present implant syringe includes the following features: a cannula, a storage element for receiving a solid material implant, an outer sleeve with a radially projecting front gripping section, with which the cannula is axially movable together with the storage element and the outer sleeve, and also an inner sleeve, on which the outer sleeve is located and in which the cannula is slidable with the storage element, whereby the inner sleeve affords axial slits, through which radial webs on the outer sleeve engage, whereby the implant syringe further includes a rod-shaped piston, which is fastened to a rear gripping section and is partially surrounded by a rear sleeve, which can slidably engage in the inner sleeve, whereby the rod-shaped piston is slidable so far through the storage element into the cannula that a gap remains between the tip of the cannula and the head end of the piston, which is approximately equal to the length of the solid material implant to be dispensed, whereby the outer sleeve is releasably locked in the advanced starting position by a blocking device on the inner sleeve when the cannula is exposed and the blocking device is moved into the release position when the rear sleeve is advanced into its end position, whereby the outer sleeve is retractable on the inner sleeve by means of the front gripping section so far that the cannula completely enters into the inner sleeve.

The invention further provides that the cannula is rigidly connected to the storage element to form a separate, that is to say separated from the remainder of the implant syringe, cannula unit, whereby the insertion of a solid material implant into the storage element is considerably simplified. The invention further provides that the webs on the outer sleeve are attached at their radially inner ends to an annular receiving member, which is situated within the inner sleeve, and that the cannula unit with a solid material implant inserted into the storage element is insertable into the receiving member and is lockable therein.

The cannula is thus rigidly connected to the storage element outside the remainder of the implant syringe so that if something goes wrong with this process only the cannula and the storage element need be discarded. Furthermore, the formation of the cannula unit is effected independently of the manufacture of the remaining members of the implant syringe and their assembly so that the manufacturing times and the associated costs of the entire implant syringe are considerably reduced.

It is proposed with particular advantage that the cannula is overmoulded with the storage element. It will be understood that the storage element and also the outer sleeve with the webs and the annular receiving member and the inner sleeve are manufactured from plastic material by an injection moulding process.

It is, however, also within the scope of the invention that the cannula can be secured in the storage element by adhesive.

It is further proposed with advantage that the annular receiving member tapers conically in the insertion direction of the storage element so that the storage element comes to be gently clamped when it is inserted. The insertion of the storage element into the receiving member is limited by a preferably annular projection, which sticks out from the storage element.

It is further proposed with advantage that in its end position after insertion the storage element is unreleasably fixed in the receiving member by at least one hook-shaped projection in that as a result of the elasticity of the plastic material which is used, the hook-shaped projection initially widens the annular receiving member and then snaps behind the rear edge of the receiving member.

The cannula of the implant syringe is covered by a protective cap during insertion of the storage element into the receiving member. In this connection, the invention proposes that the protective cap is positionable on the end section of the storage element and is insertable together with the storage element into the inner sleeve up to the radial webs of the outer sleeve. The protective cap preferably locks releasably with an inner, annular projection into a peripheral groove in the storage element.

Further features and advantages of the invention will be apparent from the following description of a preferred embodiment of the implant syringe in accordance with the invention.

DETAILED DESCRIPTION OF PREFERRED EMBODIMENTS

Figure 1:
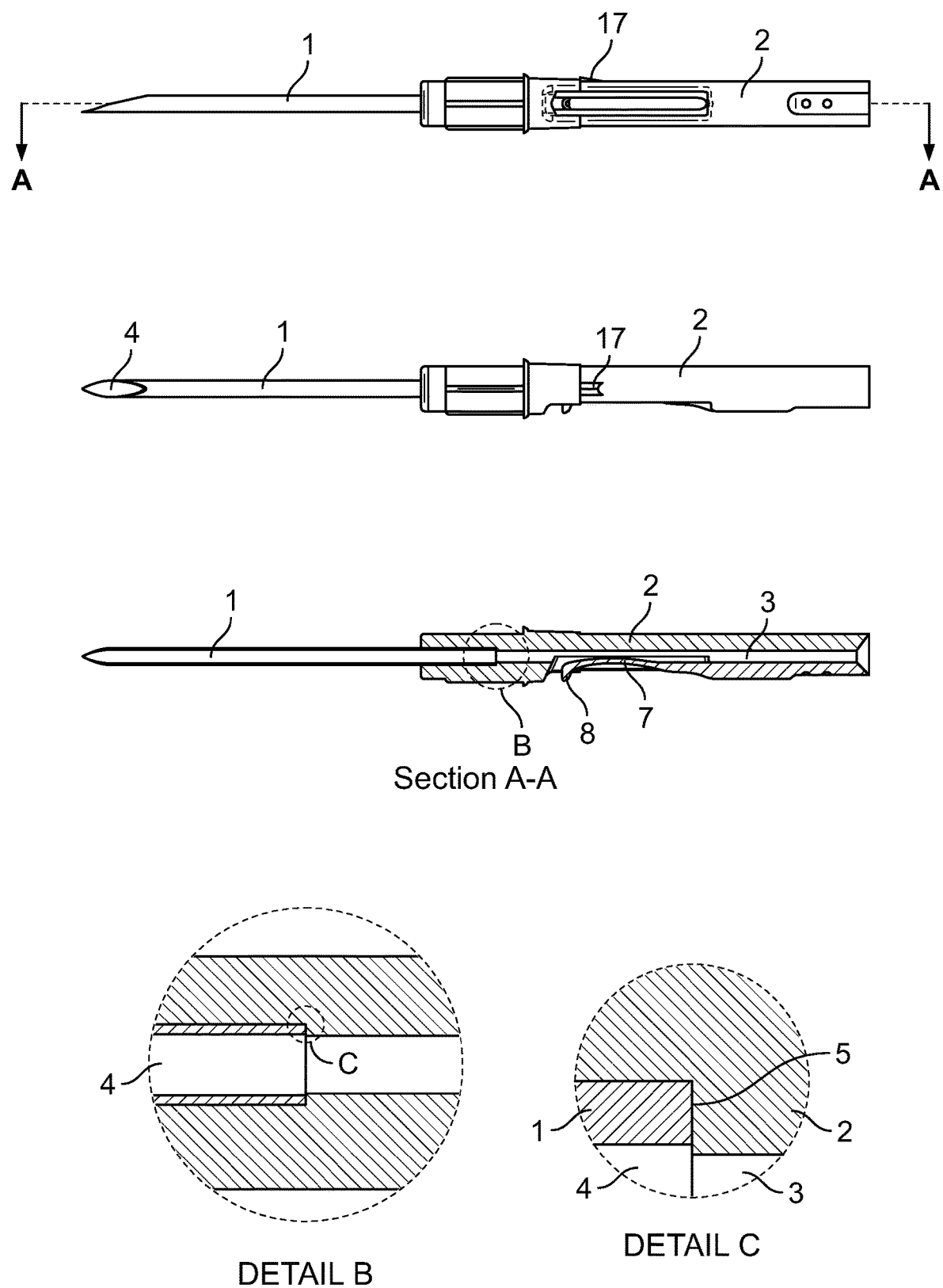
FIG. 1 is a plan view, a side view and a sectional view of a cannula unit.

FIG. 1 shows, in a number of views, a cannula 1, which is overmoulded with a storage element 2. The storage element 2 includes a central passage 3, which is in alignment with the passage 4 in the cannula 1. The rear edge 5 of the cannula is covered by the moulded on storage element 2 so that a solid material implant 6 inserted into the passage 3 in the storage element 2 may be slid smoothly into the passage 4 in the cannula 1.

Projecting into the passage 3 is a spring arm 7, which is cut free from the peripheral wall of the storage element 2 and which, in the unloaded state, so narrows the passage 3 that a solid material implant received therein can be jammed therein by the spring arm 7. The spring arm 7 has a gently convex shape extending into the passage 3 and is constructed integrally with the remainder of the storage element 2. When the solid material implant 6 is advanced by a piston, it presses the solid material implant smoothly through the narrow section, whereby the spring arm is forced somewhat outwardly. The jamming diameter for the solid material implant 6 can be adjusted by the height of the projection nose 8 on the spring arm 7.

Figure 2:
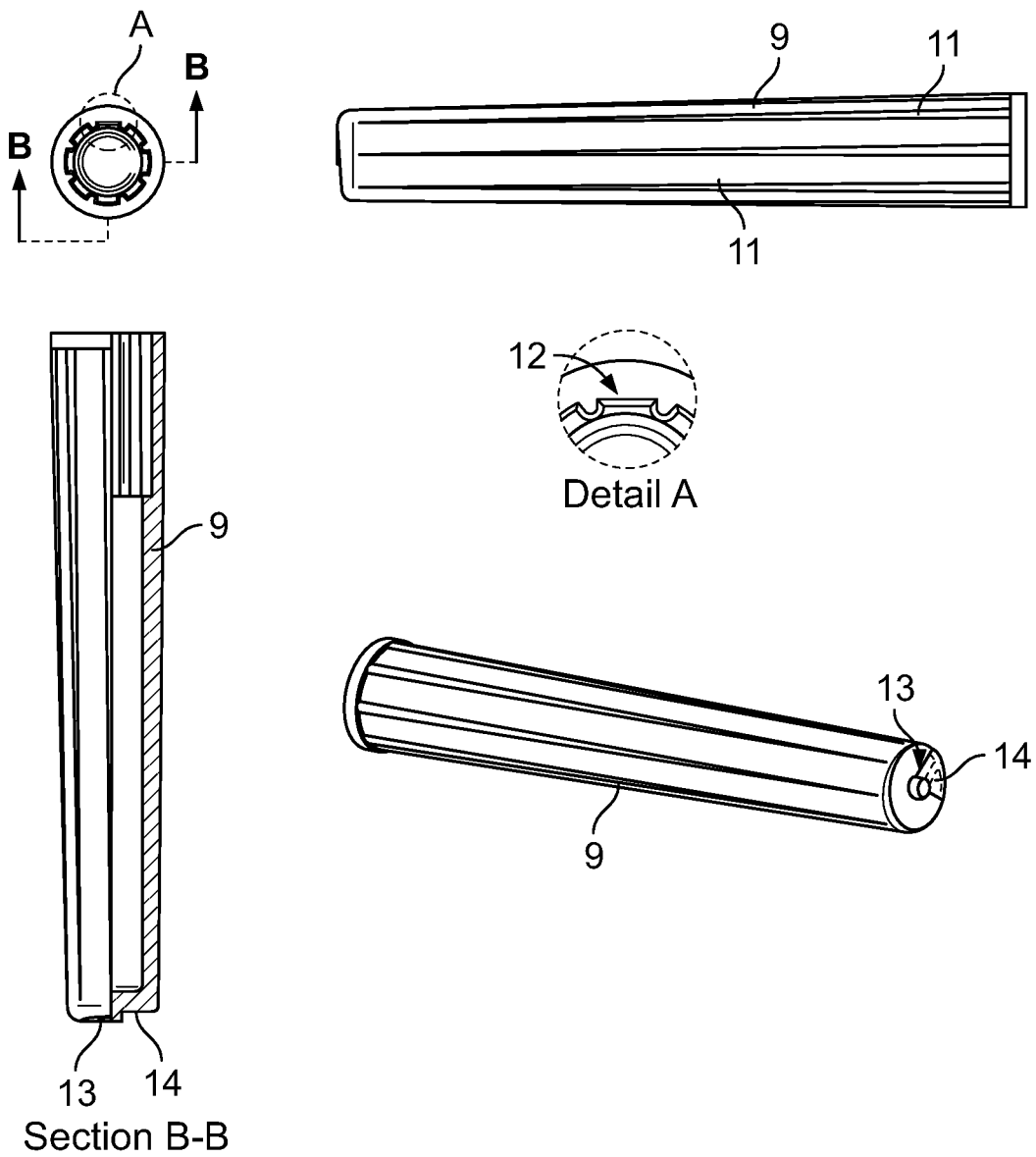
FIG. 2 is a side view, a perspective view and a partly cutaway view of a protective cap.

FIG. 2 shows different views of a protective cap 9, which is placed on the storage element 2, before it is inserted into the applicator 10. The protective cap 9 has reinforcing ribs 11, which extend in the longitudinal direction and of which one rib 12 is flattened for positional orientation in automatic assembly. The closed front wall 13 additionally includes a recess 14 for positionally orientated, automated assembly.

Figure 3:
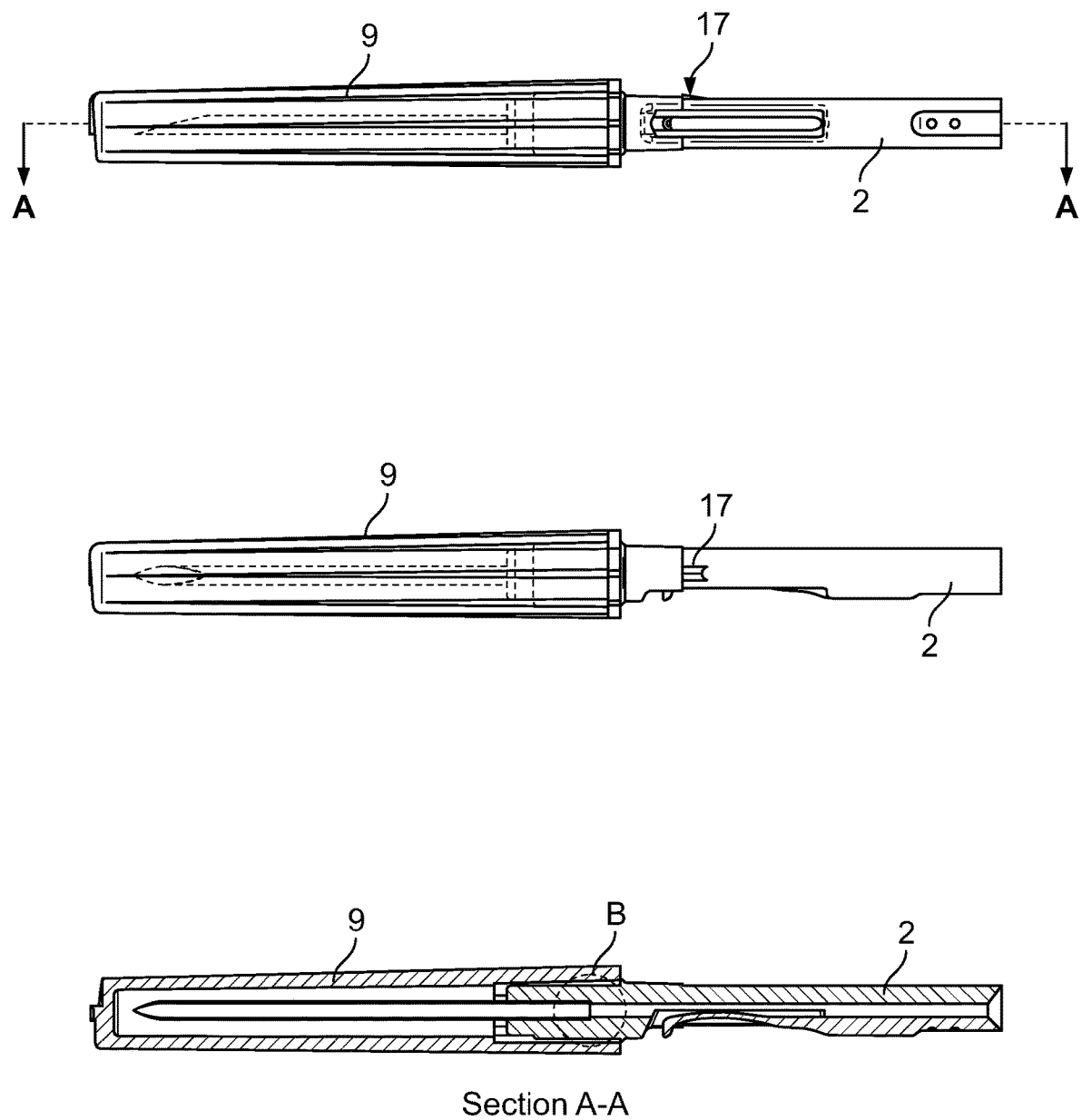
FIG. 3 is a plan view, a side view and a sectional view of the cannula element with a protective cap in the assembled state.

FIG. 3 shows, in different views, the protective cap 9 when positioned on the storage element 2. It may be seen in the enlarged view of FIG. 5 that the protective cap 9 locks into an annular groove 16 in the storage element 2 with radially inner, pimple-shaped projections 15, whereby the locking connection is readily releasable.

Figure 5:
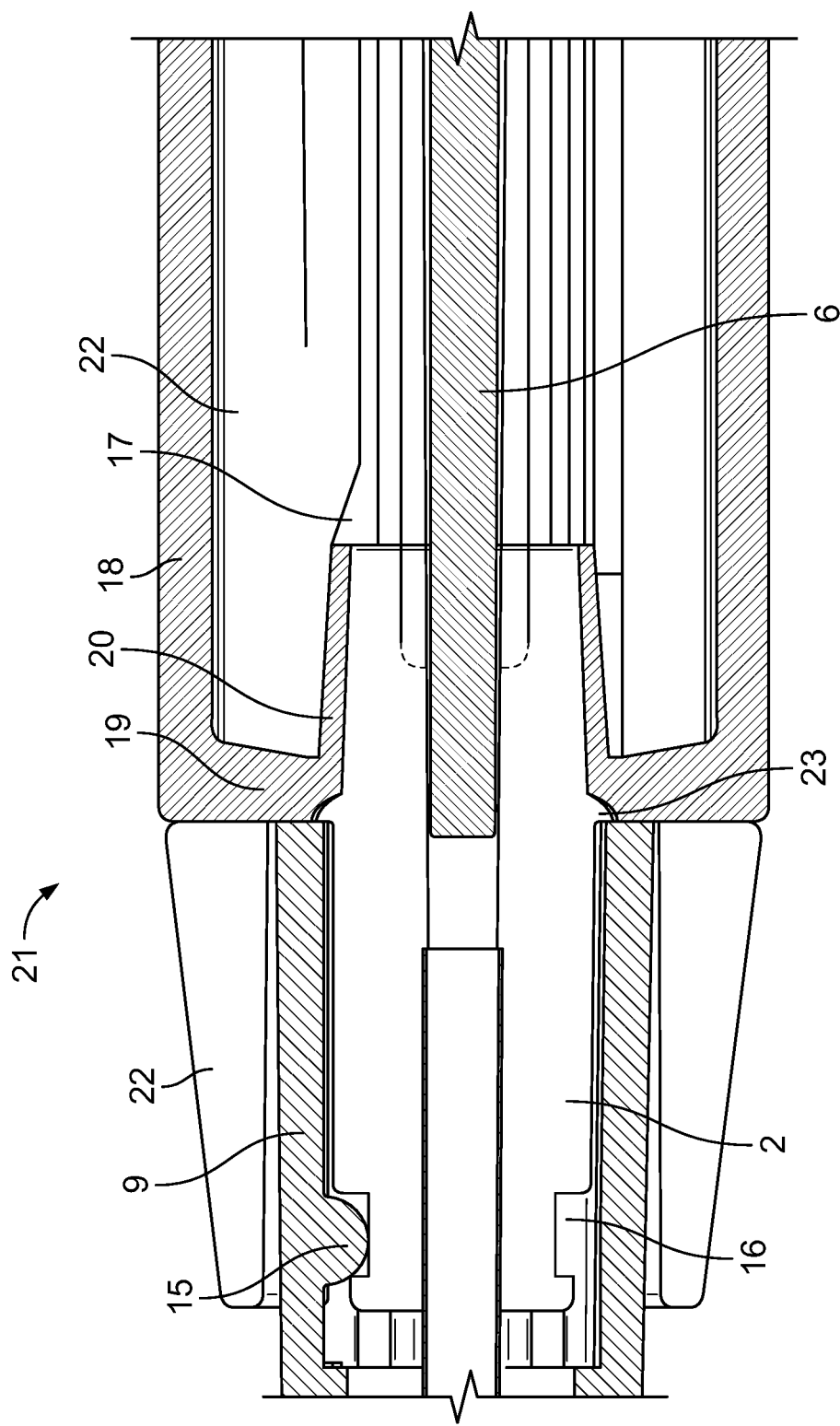
FIG. 5 is an enlarged sectional view of a region of a conical receiving member with an inserted cannula unit.

A hook-shaped projection 17 may be seen in FIGS. 1 and 3, with which the storage element 2 is to be unreleasably locked in the applicator 10. FIG. 5 shows, in a greatly enlarged view, that the outer sleeve 18 of the applicator 10 has radially inwardly projecting webs 19, which are integrally connected to an annular receiving member 20. The annular receiving member 20 tapers conically in the insertion direction (arrow 21). The webs 19 engage through slots, extending in the direction of the arrow 21, in an inner sleeve 22, on which the outer sleeve 18 is slidably located.

The cannula unit consisting of the cannula 1 and storage element 2 is slid into the conical receiving member 20, whereby the hook-shaped projection 17 on the storage element 2 elastically widens the annular receiving member 20 and snaps behind the rear end edge of the receiving member 20. The insertion is limited by an annular projection 23 on the storage element 20, which, together with the rear edge of the protective cap 9, engages the radial webs 19.

Figure 4:
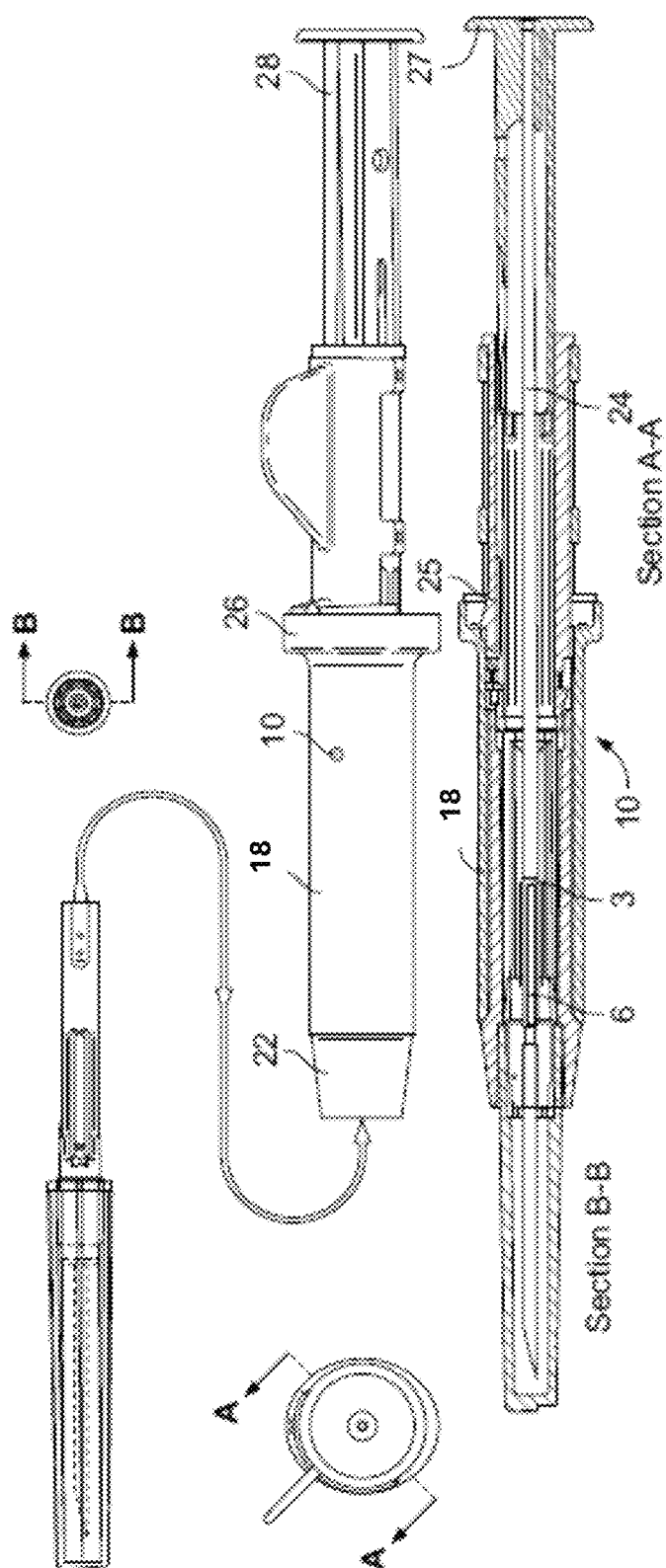
FIG. 4 is a side view and a sectional view of an applicator for fitting with a filled cannula unit.

FIG. 4 shows that projecting into the passage 3 of the storage element 2 there is a rear piston 24, by which the solid material implant 6 can be advanced to the tip of the cannula 1. When the outer sleeve 18 is released by a hook-shaped projection 25, it is retracted together with the cannula unit until the cannula 1 is situated within the inner sleeve 22, whereby the solid material implant 6 remains in the body of a patient.

The invention claimed is:

1. An implant syringe comprising:
   a cannula,
   a storage element for receiving a solid material implant,
   an outer sleeve with a radially projecting front gripping section, with which the cannula, the storage element and the outer sleeve are together axially movable,
   an inner sleeve, on which the outer sleeve is located and in which the cannula is slidable with the storage element, wherein the inner sleeve includes axial slits, through which radial webs on the outer sleeve engage,
   further including a rod-shaped piston, which is fastened to a rear gripping section and is partially surrounded by a rear sleeve, which can slidably engage in the inner sleeve, wherein the rod-shaped piston may be advanced so far through the storage element into the cannula that a spacing remains between the tip of the cannula and the head end of the piston, which is approximately equal to the length of the solid material implant to be dispensed,
   wherein the outer sleeve is releasably locked in an advanced starting position with the cannula exposed by a blocking device on the inner sleeve and when the rear sleeve is advanced into its end position the blocking device is moved into a release position,
   whereby the outer sleeve is retractable by means of the front gripping section on the inner sleeve so that the cannula enters completely into the inner sleeve,
   wherein the cannula is rigidly connected to the storage element to form a separate cannula unit separated from the remainder of the implant syringe, where radially directed inner ends of the webs on the outer sleeve are attached to an annular receiving member that tapers conically in an insertion direction of the cannula unit within the inner sleeve, and that the cannula unit is inserted through an open front end of the inner sleeve into the annular receiving member, wherein on the storage element, there is a hook-shaped projection that is configured to elastically widen the annular receiving member and snap behind a rear end edge of the annular receiving member and is locked therein,
   whereby a solid material implant is inserted into the storage element.

2. The implant syringe as claimed in claim 1, wherein the cannula is overmolded with the storage element.

3. The implant syringe as claimed in claim 1, wherein the cannula is secured in the storage element by adhesive.

4. The implant syringe as claimed in claim 1, wherein the annular receiving member tapers conically in an insertion direction of the storage element.

5. The implant syringe as claimed in claim 1, wherein the insertion of the storage element into the receiving member is limited by a projection on the storage element.

6. The implant syringe as claimed in claim 1, wherein a protective cap covering the cannula is positionable on the end section of the storage element, which may be slid into the inner sleeve with the storage element up to the radial webs on the outer sleeve.

7. The implant syringe as claimed in claim 6, wherein the protective cap releasably locks into the storage element.

* * * * *